United States Patent [19]

Williams

[11] 4,428,495
[45] Jan. 31, 1984

[54] SELF-LOCKING DEVICE

[76] Inventor: Robert A. Williams, 2721 White Settlement, Fort Worth, Tex. 76107

[21] Appl. No.: 459,800

[22] Filed: Jan. 21, 1983

[51] Int. Cl.³ ............................................. B65D 41/04
[52] U.S. Cl. ..................................... 220/288; 220/327
[58] Field of Search .............. 220/288, 289, 327, 328, 220/315

[56] References Cited

U.S. PATENT DOCUMENTS

| | | | |
|---|---|---|---|
| 2,804,116 | 8/1957 | Van Niel et al. | 220/327 |
| 2,943,445 | 7/1960 | Ritterskamp et al. | 220/328 |
| 3,291,335 | 12/1966 | Vaness | 220/328 |
| 3,300,952 | 2/1967 | Michielin | 220/327 |
| 3,369,693 | 2/1968 | Chase | 220/327 |
| 4,048,766 | 9/1977 | Dantzer et al. | 220/328 |
| 4,239,124 | 12/1980 | Inouye | 220/328 |

FOREIGN PATENT DOCUMENTS

| | | | |
|---|---|---|---|
| 679013 | 12/1964 | Italy | 220/288 |
| 478039 | 1/1938 | United Kingdom | 220/288 |

Primary Examiner—Joseph Man-fu Moy
Attorney, Agent, or Firm—Wofford, Fails & Zobal

[57] ABSTRACT

A cap member has an annular wall extending from one side thereof. Interior threads are formed around the inside of said annular wall whereby the cap may be screwed to the exterior threads of a connector to close an opening. Two angularly spaced apart slots are formed through the annular wall of the cap member transverse to the axis thereof. The annular free edge of the wall next to each slot is deformed into each slot a small amount and a gap is formed through each of the deformed portions of the annular wall.

14 Claims, 5 Drawing Figures

U.S. Patent
Jan. 31, 1984
4,428,495
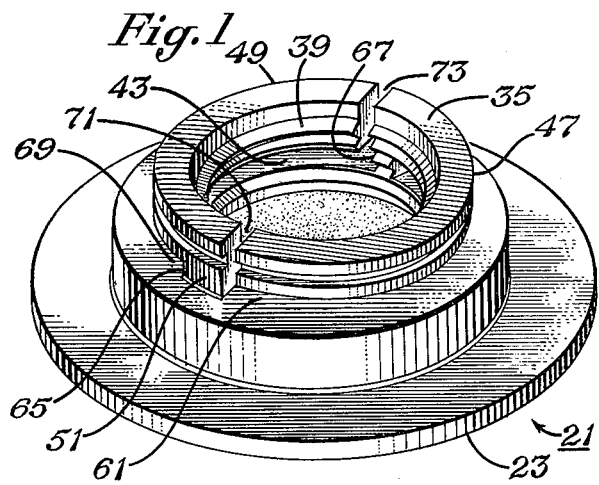
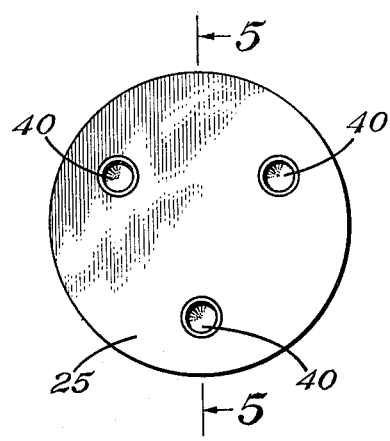
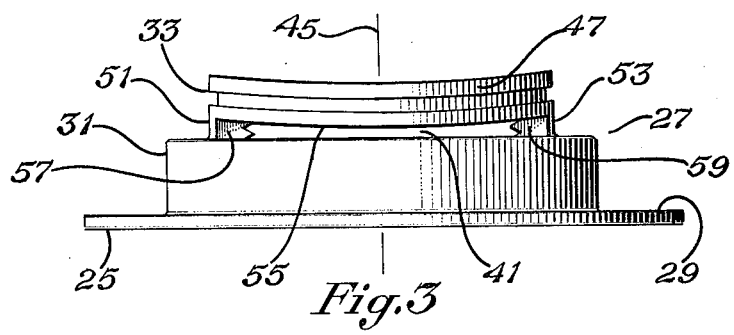
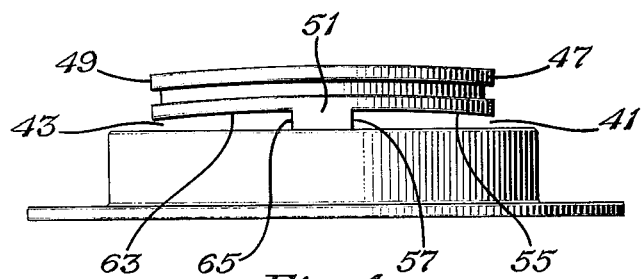
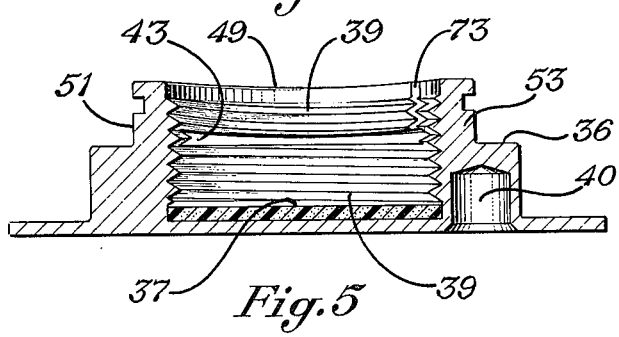

SELF-LOCKING DEVICE

BACKGROUND OF THE INVENTION

1. Field of the Invention

A device having a self-locking feature that acts to lock the device in place when it is screwed to another member.

2. Summary of the Invention

It is an object of the present invention to provide a device that has a novel self-locking feature that acts to lock the device in place when it is screwed to another member.

The device comprises an end means and an annular wall means extending from one side of said end means. Interior threads are formed around the inside of the annular wall means whereby the device may be screwed to the exterior threads of a member. At least one slot is formed through the annular wall means transverse to the axis thereof. The annular free edge of the wall next to the slot is deformed into the slot a small amount and a gap is formed through the deformed portion of the annular wall means.

In a further aspect, two angularly spaced apart slots are formed through the annular wall means transverse to the axis thereof. The annular free edge of the wall means next to each slot is deformed into each slot a small amount and a gap is formed through each of the deformed portions of the annular wall means.

BRIEF DESCRIPTION OF THE DRAWINGS

FIG. 1 is a perspective view of the self-locking device of the present invention.

FIG. 2 is a plan view of the flat side of the device of FIG. 1.

FIG. 3 is a side view of the device of FIG. 1.

FIG. 4 is a side view of the device of FIG. 1 rotated 90° from that of FIG. 3.

FIG. 5 is a cross section of FIG. 2 taken along the lines 5—5 thereof.

DESCRIPTION OF THE PREFERRED EMBODIMENT

Referring to the drawings, the self-locking device of the present invention is identified at 21. The device 21 has a round lid or cap member 23 having a flat side 25 and an annular wall 27 extending from the opposite side 29. The annular wall 27 comprises a base portion 31 having a relatively thick annular wall and a second portion 33 having a thinner annular wall with an annular free edge 35. A shoulder 36 extends between the outside of the wall portions 31 and 33. A resilient pad 37 is located within the annular wall 27 against the cap member 23. Interior threads 39 are formed around the inside of the annular wall member 27 whereby the device may be screwed to the exterior threads of an annular member such as a connector to close an opening. In the preferred embodiment, the device 21 is intended to be screwed to the exterior threads of an electrical connector located in a hole in the wing of an airplane in order to close the hole in the wing with the cap 23. The flat side 25 of the cap 23 will face outward. Three apertures 40 are formed into the device 21 from the flat side 25 to receive the prongs of a suitable tool to allow the device 21 to be screwed in place.

A self-locking feature is provided in the device 21 to allow it to lock itself to the connector after it has been screwed in place, to prevent vibration from loosening the device. The self-locking feature now will be described. Two angularly spaced apart slots 41 and 43 are machined through the annular wall portion 33 of angular wall 27, transverse to the axis 45 thereof. Preferrably the slots 41 and 43 have the same dimensions. Each of the slots 41 and 43 extend over an arc preferrably greater than 90° but less than 180°. In one example, the arc of each of the slots 41 and 43 may be of the order of 150°. The wall portions 47 and 49 between the annular edge 35 and the slots 41 and 43 respectively are supported by the wall portions 51 and 53 remaining at the level of the slots 41 and 43 after the slots are formed. Slot 41 may be defined by the arcuate edge 55 of wall portion 47, side edges 57 and 59 of wall portions 51 and 53 and arcuate edge 61 of wall portion 33 at the level of the shoulder 36. Similarly, slot 43 may be defined by the arcuate edge 63 of wall portion 49, side edges 65 and 67 of wall portions 51 and 53, and the arcuate edge 69 of wall portion 33 at the level of the shoulder 36. The threads 39 formed around the inside of the wall 27 extend around the inside of wall portions 47, 49, and 31.

After the slots 41 and 43 are machined in the device, a force is applied to the annular edge 35 between the wall portions 51 and 53 to deform the wall portions 47 and 49 a small amount into the slots 41 and 43 respectively. Thus wall portions 47 and 49 extend a small amount toward edges 61 and 69 of their associated slots 41 and 43, respectively.

After the wall portions 47 and 49 are deformed, radial gaps or slots 71 and 73 are formed through the wall portions 47 and 49 respectively to provide wall portions 47 and 49 with free ends that have a spring action. The slight deformation of the wall portions 47 and 49 does not prevent the interior threads 39 of the device 21 from being screwed to mating exterior threads of a connector. The slight deformation of wall portions 47 and 49, plus the gaps 71 and 73 resulting in the spring action of wall portions 41 and 43 form a self-locking feature which acts to lock the device to the connector after it has been screwed in place.

Although the wall portions 47 and 49 are shown to be deformed symetrically relative to the central axis 75, it is to be understood that the wall portions 47 and 49 could be deformed slightly off center. The radial slots 71 and 73 are shown machined next to supporting wall portions 51 and 53, however, it is to be understood that the radial gaps 71 and 73 could be machined through wall portions 47 and 49 at positions spaced away from the supporting wall portions 51 and 53 whereby each of the wall portions 47 and 49 would have two free ends rather than one free end.

I claim:

1. A self-locking device, comprising:

an end means, an annular wall means extending from one side of said end means, interior threads formed around the inside of said annular wall means whereby said device may be screwed to the exterior threads of a member, at least one slot formed through said annular wall means defining a wall portion of said annular wall means with said slot located between said wall portion and said end means, a portion of said interior threads being formed on the inside of said wall portion, said wall portion being deformed into said slot a small amount such that said wall portion extends into said slot a small amount, and a gap formed through said wall portion.

2. A self-locking device, comprising:

an end means, an annular wall means extending from one side of said end means and having an annular edge facing away from said end means, interior threads formed around the inside of said annular wall means whereby said device may be screwed to the exterior threads of a member, at least one slot formed through said annular wall means, transverse to the axis thereof, between said annular edge and said end means, said slot being defined by a wall portion of said annular wall means next to said annular edge, a portion of said annular wall means next to said end means, and two spaced apart side edges, a portion of said interior threads being formed on the inside of said wall portion and on the inside of said portion of said annular wall means next to said end means, said wall portion being deformed into said slot a small amount such that said wall portion extends into said slot a small amount, and a gap formed through said wall portion such that said wall portion has at least one free end.

3. The device of claim 2, wherein:

said end means comprises a closure member.

4. The device of claim 3, wherein:

said gap extends radially relative to the axis of said annular wall means.

5. A self-locking device, comprising:

an end means, an annular wall means extending from one side of said end means and having an annular edge facing away from said end means, interior threads formed around the inside of said annular wall means whereby said device may be screwed to the exterior threads of a member, two angularly spaced apart slots formed through said wall means, transverse to the axis thereof, between said annular edge and said end means, each of said slots being defined by a wall portion of said annular wall means next to said annular edge, a portion of said annular wall means next to said end means, and two spaced apart side edges, a portion of said interior threads being formed on the inside of said wall portions and on the inside of said portions of said wall means next to said end means, each of said wall portions being deformed into its associated slot a small amount such that each of said wall portions extends into its associated slot a small amount, and a gap formed through each of said wall portions.

6. The device of claim 5, wherein:

said end means comprises a closure member.

7. The device of claim 5, wherein:

said gaps extend radially relative to the axis of said annular wall means.

8. A self-locking device, comprising:

an end means, an annular wall means extending from one side of said end means and having an annular edge facing away from said end means, interior threads formed around the inside of said annular wall means whereby said device may be screwed to the exterior threads of a member, at least one slot formed through said annular wall means, said slot being defined by a wall portion of said annular wall means next to said annular edge and an edge formed on a portion of said annular wall means next to said end means and facing away from said end means, a portion of said interior threads being formed on the inside of said wall portion and on the inside of said portion of said annular wall means next to said end means, said wall portion being deformed toward said edge of said slot facing away from said end means such that said wall portion extends toward said edge of said slot facing away from said end means, and a gap formed formed through said wall portion.

9. A self-locking device, comprising:

an end means, an annular wall means extending from one side of said end means and having an annular edge facing away from said end means, interior threads formed around the inside of said annular wall means whereby said device may be screwed to the exterior threads of a member, at least one slot formed through said annular wall means, transverse to the axis thereof, between said annular edge and said end means, said slot being defined by a wall portion of said annular wall means next to said annular edge, an edge formed on a portion of said annular wall means next to said end means and facing away from said end means, and two spaced apart side edges, a portion of said interior threads being formed on the inside of said wall portion and on the inside of said portion of said wall means next to said end means, said wall portion being deformed toward said edge of said slot facing away from said end means such that said wall portion extends toward said edge of said slot facing away from said end means, and a gap formed through said wall portion such that said wall portion has at least one free end.

10. The device of claim 9, wherein:

said end means comprises a closure member.

11. The device of claim 10, wherein:

said gap extends radially relative to the axis of said annular wall means.

12. A self-locking device, comprising:

an end means, an annular wall means extending from one side of said end means and having an annular edge facing away from said end means, interior threads formed around the inside of said annular wall means whereby said device may be screwed to the exterior threads of a member, two angularly spaced apart slots formed through said wall means, transverse to the axis thereof, between said annular edge and said end means, each of said slots being defined by a wall portion next to said annular edge, an edge formed on a portion of said wall means next to said end means and facing away from said end means, and two spaced apart side edges, a portion of said interior threads being formed on the inside of said wall portions and on the inside of said portions of said wall means next to said end means, each of said wall portions being deformed toward the edge of its associated slot facing away from said end means such that each of said wall portions extends toward the edge of its associated slot facing away from said end means, and a gap formed through each of said wall portions.

13. The device of claim 12, wherein:
said end means comprises a closure member.

14. The device of claim 12, wherein:
said gaps extend radially relative to the axis of said annular wall means.

* * * * *